(12) United States Patent
Halliday et al.

(10) Patent No.: US 10,126,452 B2
(45) Date of Patent: Nov. 13, 2018

(54) WAVEFIELD GENERATION USING A SEISMIC VIBRATOR ARRAY

(71) Applicant: WESTERNGECO LLC, Houston, TX (US)

(72) Inventors: David Fraser Halliday, Cambridge (GB); Jon-Fredrik Hopperstad, Cambridge (GB); Robert Montgomery Laws, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 33 days.

(21) Appl. No.: 15/122,948

(22) PCT Filed: Mar. 19, 2015

(86) PCT No.: PCT/US2015/021520
§ 371 (c)(1),
(2) Date: Sep. 1, 2016

(87) PCT Pub. No.: WO2015/143189
PCT Pub. Date: Sep. 24, 2015

(65) Prior Publication Data
US 2017/0075015 A1 Mar. 16, 2017

Related U.S. Application Data

(60) Provisional application No. 61/968,178, filed on Mar. 20, 2014.

(51) Int. Cl.
*G01V 1/38* (2006.01)

(52) U.S. Cl.
CPC .......... *G01V 1/3861* (2013.01); *G01V 1/3808* (2013.01); *G01V 2210/1293* (2013.01); *G01V 2210/56* (2013.01)

(58) Field of Classification Search
CPC .............. G01V 1/3861; G01V 1/3808; G01V 2210/56; G01V 2210/1293
USPC .......................................................... 367/23
See application file for complete search history.

(56) References Cited

U.S. PATENT DOCUMENTS

| | | | |
|---|---|---|---|
| 4,636,956 | A | 1/1987 | Vannier et al. |
| 6,028,818 | A | 2/2000 | Jeffryes |
| 7,876,642 | B2 | 1/2011 | Robertsson et al. |
| 2004/0089499 | A1 | 5/2004 | Smith et al. |
| 2006/0076183 | A1 | 4/2006 | Duren et al. |
| 2008/0019215 | A1 | 1/2008 | Halliday et al. |
| 2010/0008184 | A1 | 1/2010 | Hegna et al. |

(Continued)

FOREIGN PATENT DOCUMENTS

| | | |
|---|---|---|
| CN | 100420960 C | 9/2008 |
| CN | 101907728 A | 12/2010 |

(Continued)

OTHER PUBLICATIONS

Moore et al., "Simultaneous Source Separation Using Dithered Sources," SEG Las Vegas 2008 Annual Meeting (5 pages).
I. Vasconcelos et al., "Reverse-Time Imaging of Dual-Source 4C Marine Seismic Data Using Primaries, Ghosts, and Multiples," 74th EAGE Conference & Exhibition, Copenhagen, Denmark, Jun. 4-7, 2012, (5 pages).

(Continued)

*Primary Examiner* — Daniel L Murphy
(74) *Attorney, Agent, or Firm* — Kevin Brayton McGoff (57) ABSTRACT

Marine seismic vibrators in a marine seismic vibrator array for use in a seismic survey are activated to produce a source gradient wavefield to survey a target structure. The seismic survey may comprise a marine seismic survey conducted in a body of water.

19 Claims, 7 Drawing Sheets

(56) References Cited

U.S. PATENT DOCUMENTS

| | | |
|---|---|---|
| 2011/0063943 A1 | 3/2011 | Muyzert et al. |
| 2011/0063946 A1 | 3/2011 | Muyzert et al. |
| 2011/0110188 A1 | 5/2011 | Robertsson et al. |
| 2011/0194376 A1 | 8/2011 | Hallock et al. |
| 2012/0314536 A1 | 12/2012 | Bagaini |
| 2013/0343153 A1 | 12/2013 | Laws |
| 2014/0027122 A1 | 1/2014 | Meier et al. |
| 2014/0278116 A1 | 9/2014 | Halliday et al. |
| 2014/0278119 A1 | 9/2014 | Halliday et al. |

FOREIGN PATENT DOCUMENTS

| | | |
|---|---|---|
| CN | 103477246 A | 12/2013 |
| CN | 103582828 A | 2/2014 |
| WO | 2010/059304 A1 | 5/2010 |
| WO | 2010/093896 A2 | 8/2010 |
| WO | 2013/105062 A1 | 7/2013 |
| WO | 2013105075 A1 | 7/2013 |

OTHER PUBLICATIONS

Massimiliano Vassallo et al., "Crossline Wavefield Reconstruction for Multi-Components Streamer Data: Part 1—Multi-Channel Interpolation by Matching Pursuit (MIMAP) Using Pressure and Its Crossline Gradient," Society of Exploration Geophysicists, Geophysics, vol. 75, No. 6, Nov.-Dec. 2010 (15 pages).

International Search Report and Written Opinion in the related PCT application PCT/US2015/021520, dated Jun. 25, 2016 (16 pages).

Halliday, et al., "Full-wavefield, towed-marine seismic acquisition and applications," SEG Technocal Program Exapnded Abstracts 2012, Sep. 1, 2012, pp. 1-5.

Extended Search Report for the equivalent European patent application 15765473.2 dated Sep. 27, 2017.

Office Action for the equivalent Chinese patent application 201580021945.4 dated Oct. 31, 2017.

Decision on grant for the equivalent Russian patent application 2016141070/28 dated Apr. 17, 2018.

Office Action for the equivalent Russian patent application 2016141070/28 dated Sep. 29, 2017.

WAVEFIELD GENERATION USING A SEISMIC VIBRATOR ARRAY

CROSS-REFERENCE TO RELATED APPLICATION

This application claims the benefit under 35 U.S.C. § 119(e) of U.S. Provisional Application Ser. No. 61/968,178, filed Mar. 20, 2014, which is hereby incorporated by reference.

BACKGROUND

Seismic surveying can be used for identifying subsurface elements of interest, such as hydrocarbon reservoirs, freshwater aquifers, gas injection zones, and so forth. In seismic surveying, seismic sources are activated to generate seismic waves directed into a subsurface structure.

The seismic waves generated by a seismic source travel into the subsurface structure, with a portion of the seismic waves reflected back to the surface for receipt by seismic receivers (e.g. geophones, hydrophones, accelerometers, etc.). These seismic receivers record/generate signals that represent detected seismic waves. Signals from the seismic receivers are processed to yield information about the content and characteristics of the subsurface structure.

A marine survey arrangement can include towing a streamer of seismic receivers through a body of water, or placing a seabed cable or other arrangement of seismic receivers on the seafloor.

BRIEF SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth in this summary.

In embodiments of the present disclosure, seismic vibrators in a seismic vibrator array are activated, where the activating causes at least two of the seismic vibrators to be out-of-phase, to produce a source gradient wavefield for surveying a target structure.

Other or alternative features will become apparent from the following description, from the drawings, and from the claims.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact Survey equipment including one or more seismic sources and seismic receivers can be used to perform surveying of a target structure. In some examples, the target structure can be a subsurface structure beneath an earth surface. Surveying such a subsurface structure can be performed for various purposes, such as for identifying a subsurface element of interest, including a hydrocarbon-bearing reservoir, a fresh water aquifer, a gas injection zone, or other subsurface elements of interest.

Although reference is made to performing surveying of a subsurface structure, techniques or mechanisms according to some implementations can also be applied to perform surveys of other structures, such as human tissue, plant tissue, animal tissue, a mechanical structure, a solid volume, a liquid volume, a gas volume, a plasma volume, and so forth.

Different types of seismic sources can be employed. For example, a seismic source can include an air gun, which when activated releases compressed air to produce a pulse of acoustic energy. Another type of seismic source is a seismic vibrator, which produces acoustic energy based on oscillating movement of a vibrating element that impacts a structure in the seismic vibrator. The oscillating movement of the vibrating element can be controlled by an activation signal, which can be a sinusoidal wave signal or other type of signal that causes oscillating movement of the vibrating element.

The phase of the activation signal can be controlled for various purposes, such as to perform noise reduction or for other purposes. Generally, a seismic vibrator refers to any seismic source that produces a wavefield in response to an activation signal whose phase can be adjusted independently at each frequency. In particular, the vibrator may be a volumetric seismic source, i.e. it generates a wavefield through changing its volume.

Traditionally, a seismic source (or a collection of seismic sources) is activated such that the seismic source(s) produce(s) an approximately monopolar source wavefield. A monopolar wavefield is a wavefield that radiates energy generally equally in all directions. In practice, this directionality is modified by the aperture effect of the source array (since the source array typically includes sources in different horizontal and/or vertical locations), and if the source is located adjacent to the sea surface, the directionality is also modified by the interference effect of the sea surface. To produce an approximately monopolar wavefield using a seismic vibrator array that includes multiple seismic vibrators, the seismic vibrators are controlled to be in-phase with respect to each other. For example, if all vibrators are at the same depth, then no two vibrators within the array have a phase difference whose cosine is less than zero. A seismic vibrator array can refer to any arrangement of multiple seismic vibrators.

In accordance with some implementations, in addition to being able to produce an approximately monopolar source wavefield, a seismic vibrator array can also be controlled to produce a source gradient wavefield. A source gradient wavefield is a wavefield that has a substantially different radiation pattern to that of the monopolar source wavefield. Whereas the monopolar source wavefield radiates energy equally in all directions, the gradient source radiates energy with different polarity in different directions. For example, if the gradient source is oriented in the y direction, then the wavefield will have a positive polarity in the positive y direction, and a negative polarity in the negative y direction. The source then has zero-output in at least one direction where the changeover from positive to negative polarity occurs. If the time domain wavefield due to a source at position $y_1$ is defined as $S(y_1,t)$, then the gradient of this wavefield in the y direction is given as $dS(y_1,t)/dy$. While it may not be possible to generate a wavefield corresponding exactly to this derivative term, this can be approximated as the difference of two monopolar sources at the same depth:

$$dS(y_1,t)/dy \approx (S(y_1 + \Delta y, t) - S(y_t - \Delta y, t))/2\Delta y. \quad (1)$$

In Eq. 1, $2\Delta y$ is the separation between the two monopolar sources. Therefore, the source gradient can be generated by locating two or more sources together, and having two or more sources sweeping with opposite polarity (corresponding to the difference in Eq. 1). In this case, the output signals produced by at least two seismic vibrators are 180° out-of-phase, in which case the at least two seismic vibrators are considered to be in anti-phase. In other examples, the at least two seismic vibrators may not be exactly in anti-phase, but the property that the source has different polarity in different directions may still be obtained. For example, this would be the case when the sources are at the same depth, and any two are out-of-phase by an angle whose cosine is less than zero. The source gradient wavefield produced by the monopolar sources according to the foregoing configurations is not an idealized mathematical source gradient wavefield. To achieve production of a mathematical source gradient wavefield, the monopolar sources would have to be 180° out-of-phase, their separation, $2\Delta y$, would have to approach nil, and their amplitudes would have to approach infinity. In practice the output level of the monopolar sources cannot approach infinity, so there is a practical trade-off between "close enough" to approximate the idealized mathematical gradient and "far enough" apart to generate useable output level. The "source gradient wavefield" produced by a source array according to some implementations is thus an approximate source gradient wavefield.

Additionally, in accordance with some implementations, the seismic vibrator array can also be controlled such that the seismic vibrator array is a monopolar source that produces a monopolar source wavefield. To produce the monopolar source wavefield, the seismic vibrators of the seismic vibrator array are controlled such that they are in-phase (with some of the seismic vibrators slightly out-of-phase to account for different positions of the seismic vibrators, e.g. different depths of the seismic vibrators in a body of water, assuming the seismic vibrator array is part of a marine survey arrangement).

Using the seismic vibrator array according to some implementations, greater flexibility is offered since the seismic vibrator array is selectively controllable to be a monopolar source or a gradient source. During a survey operation, the seismic vibrator array can be controlled to be a monopolar source for some shots, and can be controlled to be a gradient source for other shots, such that a target shot pattern can be developed. A "shot" can refer to an activation of the seismic vibrator array.

Figure 1:
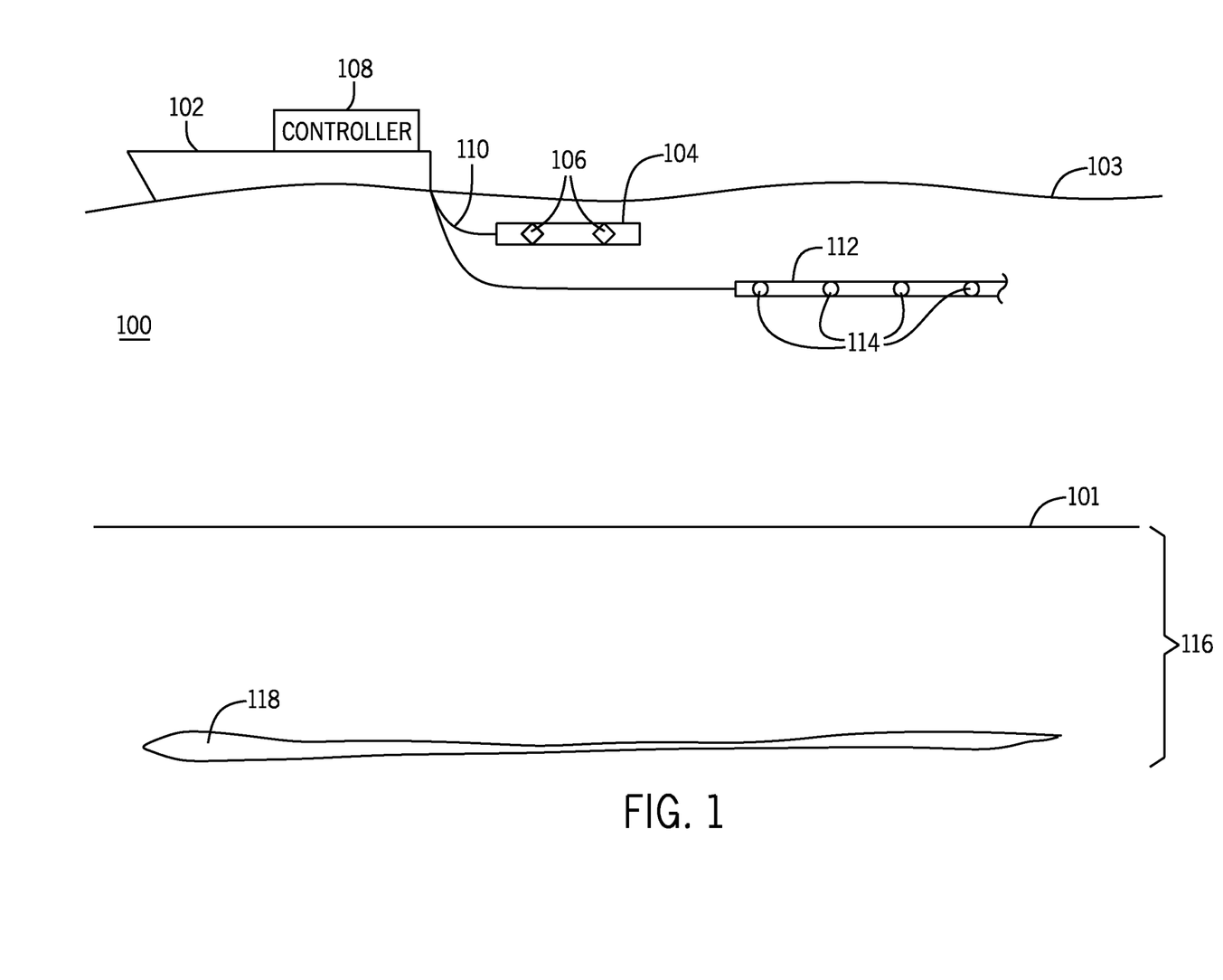
FIG. 1 is a schematic side view of a marine survey arrangement according to some implementations.

FIG. 1 is a schematic diagram of an example marine survey arrangement that includes a marine vessel 102 that tows a seismic vibrator array 104 according to some implementations through a body of water 100. The seismic vibrator array 104 includes seismic vibrators 106 that can be activated in response to activation signals produced by a controller 108 and provided by the controller 108 over a link 110 to the seismic vibrator array 104.

In the example of FIG. 1, the marine vessel 102 also tows a streamer 112 that includes seismic receivers 114. With other types of survey arrangements, an arrangement of seismic receivers can be provided on the water bottom 101, may be deployed on unmanned autonomous vehicles, may be suspended in the water, or may be deployed in any other configuration.

The seismic receivers 114 are configured to detect wavefields reflected from a subsurface structure 116 that is underneath an earth surface (which in FIG. 1 is the water bottom 101, such as the sea floor or sea bottom). The subsurface structure 116 can include one or multiple subsurface elements of interest (118). Source wavefields propagated by the seismic sources 106 are propagated into the subsurface structure 116. The subsurface structure 116 reflects a part of the source wavefields, where the reflected wavefields are detected by the seismic receivers 114. Measured data acquired by the seismic receivers 114 can be communicated to the controller 108 for storage or for processing.

The seismic vibrators 106 in the seismic vibrator array 104 can be controlled to either be in-phase or out-of-phase to cause production of a monopolar source wavefield or a source gradient wavefield, respectively, in accordance with some implementations. The controller 108 can send activation signals to the seismic vibrator array 104 to control the seismic vibrator array 104 to produce a monopolar source wavefield in a first shot (i.e. first activation of the seismic vibrator array 104) and to produce a source gradient wavefield in a second shot.

In some examples, activation of the seismic vibrator array 104 can be controlled such that a pattern of monopolar source wavefields and source gradient wavefields are produced in successive shots. This pattern can be an alternating pattern, where the seismic vibrator array 104 alternates between producing a monopolar source wavefield and a source gradient wavefield in successive shots. In other examples, other activation patterns can be produced.

Figure 2:
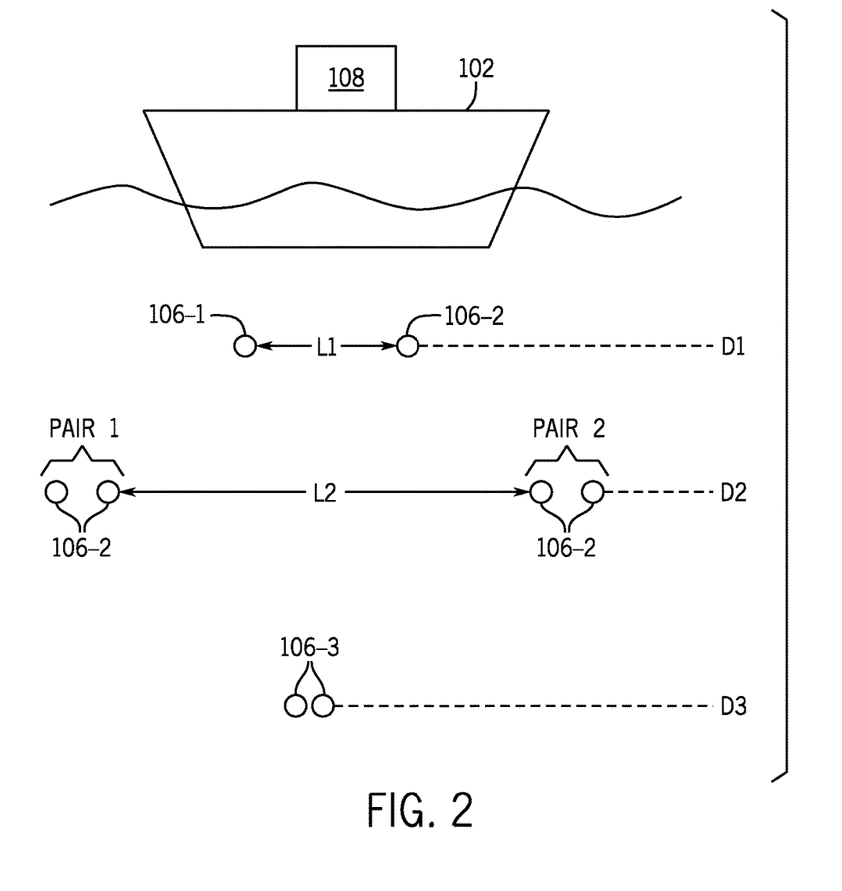
FIG. 2 is a schematic rear view of a marine survey arrangement that includes a seismic vibrator array according to some implementations.

FIG. 2 is a schematic diagram of a rear view of the example survey arrangement of FIG. 1. As depicted in the example of FIG. 2, the survey vibrator array 104 includes seismic vibrators at various different depths, D1, D2, and D3. Although seismic vibrators are shown at three different depths in the example of FIG. 2, it is noted that in other examples, seismic vibrators can be included at less than three depths or at more than three depths. The seismic vibrators at different depths are configured to be activated with activation signals in different frequency ranges. For example, seismic vibrators 106-3 at depth D3 can be configured to be activated using activation signals that sweep from 0 to 15 hertz (Hz). Sweeping an activation signal from a first frequency to a second frequency refers to controlling the activation signal such that the frequency of the activation signal is changed from the first frequency to the second frequency.

Seismic vibrators 106-2 at depth D2 can be configured to be activated using activation signals that sweep from 15 to 25 Hz. Seismic vibrators 106-1 at depth D1 can be configured to be activated by activation signals that sweep from 25 to 100 Hz. In other examples, the activation signals for the seismic vibrators at different depths can be swept in different frequency ranges. More generally, a shallower set of one or more seismic vibrators is swept in a higher frequency range, and a deeper set of one or more seismic vibrators is swept in a lower frequency range.

The seismic vibrators are separated by a separation distance L. In some examples, the separation distance L can be ⅓ of the shortest wavelength of interest, and in some implementations, no larger than ½ of the shortest wavelength of interest. The shortest wavelength of interest is dependent on the maximum frequency output by the two or more seismic vibrators, and can therefore vary for different seismic vibrators, such as when deployed at different depth levels as described above. One way to define the shortest wavelength of interest can be to define the maximum take-off angle of interest, φ, which then allows the shortest wavelength of interest to be defined as, $$\lambda_{min} = \frac{1}{f_{max}} c \cdot \sin\varphi. \qquad (2)$$

Here, $\lambda_{min}$ is the shortest wavelength of interested, $f_{max}$ is the maximum output frequency (e.g. for the current depth level), and c is the velocity of sound in water. The separation distance can therefore change for the vibrators deployed at different depth levels, provided the vibrators at the different levels emit different frequency bands as described. Thus, seismic vibrators 106-1 may be separated by a distance L1, and seismic vibrators 106-2 may be separated by a distance L2.

Each separation distance L1 and L2 is sufficiently large such that a useable output level for the source gradient wavefield is produced, while sufficiently small to retain the characteristics of the idealized mathematical gradient. As noted above, the separation distance can be generally ⅓ of the minimum wavelength of the source gradient wavefield produced by the respective seismic vibrators. In other examples, the separation distance can be greater than ⅓ the wavelength of this minimum wavelength, so long as the separation distance allow for production of a source gradient wavefield.

In the example of FIG. 2, the seismic vibrators 106-3 at depth D3 are driven in-phase. That is to say the relative phase has a cosine that is greater than zero. As a result, the seismic vibrators 106-3 do not produce a source gradient wavefield. Instead, the pair of seismic vibrators 106-3 is configured to produce just a monopolar source wavefield.

Although two pairs (Pair 1 and Pair 2) of seismic vibrators 106-2 are shown at depth D2 in FIG. 2, it is noted that in other examples, just two seismic vibrators 106-2 can be provided at depth D2, where these two seismic vibrators are separated by distance L2. Similarly, just one seismic vibrator 106-3 can be provided at depth D3.

To produce a monopolar source wavefield using the seismic vibrator array 104 depicted in FIG. 2, the seismic vibrators 106-1, 106-2, and 106-3 are driven to be in-phase. The seismic vibrators 106-1, 106-2, and 106-3 are considered to be in phase even though the activation signals for the seismic vibrators 106-1, 106-2, and 106-3 may be slightly out-of-phase, with phase delays provided between the respective activation signals to account for depth differences of the seismic vibrators 106-1, 106-2, and 106-3. The net effect of the activation signals that are slightly out-of-phase is that the seismic vibrators 106-1, 106-2, and 106-3 at different depths produce wavefields as if they were driven in-phase.

On the other hand, to produce a source gradient wavefield, the left and right seismic vibrators 106-1 at depth D1 are driven to be out-of-phase (more specifically in anti-phase), and the left pair of seismic vibrators 106-2 and right pair of seismic vibrators 106-2 at depth D2 are also driven to be out-of-phase (more specifically driven anti-phase).

Figure 3:
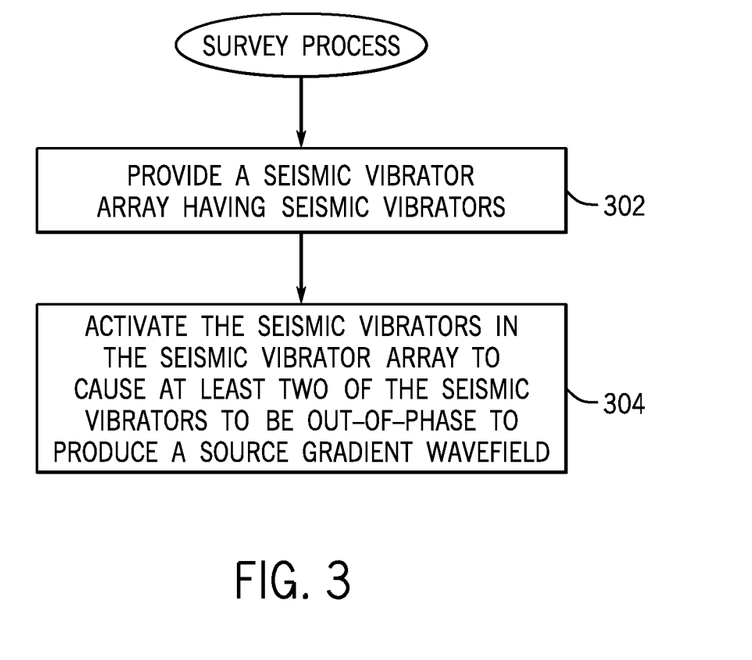
FIG. 3 is a flow diagram of a survey process according to some implementations.

FIG. 3 is a flow diagram of a survey process according to some implementations. The survey process includes providing (at 302) a seismic vibrator array (e.g. 104 in FIGS. 1 and 2) that has seismic vibrators. The survey process activates (at 304), such as under control of the controller 108 of FIGS. 1 and 2, the seismic vibrators in the seismic vibrator array, where the activating causes at least two of the seismic vibrators to be out-of-phase to produce a source gradient wavefield for surveying a target structure, such as the subsurface structure 116 shown in FIG. 1.

Causing the seismic vibrators to be out-of-phase can be accomplished by sweeping the seismic vibrators to be in anti-phase (or close to anti-phase, for example, to preserve energy output, or to account for depth differences). Sweeping seismic vibrators in anti-phase refers to activating a first of the seismic vibrators using an activation signal that is in anti-phase with respect to an activation signal used to activate another of the seismic vibrators. The seismic vibrators sweeping in anti-phase are separated by a suitable distance (such as described further above) to generate a source gradient signal. As noted above, the separation distance is frequency dependent, with an example of the separation distance being ⅓ of the minimum wavelength of the source gradient wavefield.

Figure 4:
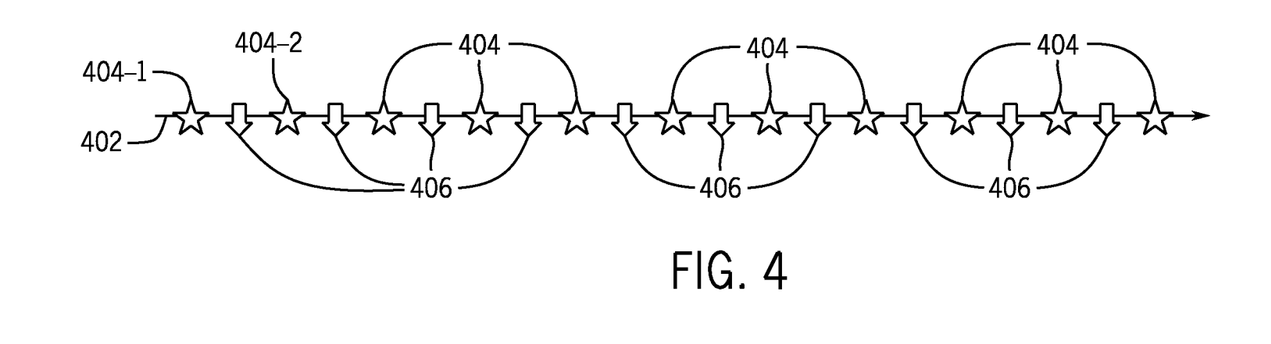
FIGS. 4-6 illustrate example activation patterns of a seismic vibrator array according to various implementations.

FIG. 4 shows an example shot pattern that can be produced using the seismic vibrator array 104 as towed by the marine vessel 102, according to some examples. The tow path of the marine vessel 102 is indicated by 402. As shown in FIG. 4, stars (404) and arrows (406) represent respective shots of the seismic vibrator array 104. A star (404) represents a respective activation of the seismic vibrator array 104 that produces a monopolar source wavefield. An arrow (406) represents an activation of the seismic vibrator array 104 that produces a source gradient wavefield. In FIG. 4, the first two stars along the path 402 are referred to as 404-1 and 404-2, respectively, and the first arrow along path 402 is referred to as 406-1. A general reference to stars 404 includes a reference to 404-1 and 404-2, and a general reference to arrows 406 includes a reference to 406-1.

In the example of FIG. 4, an alternating pattern of monopolar source activations and source gradient activations is depicted, where successive shots alternate between a monopolar source activation (activation of the seismic vibrator array 104 that produces a monopolar source wavefield) and a source gradient activation (activation of the seismic vibrator array 104 that produces a source gradient wavefield).

Figure 5:
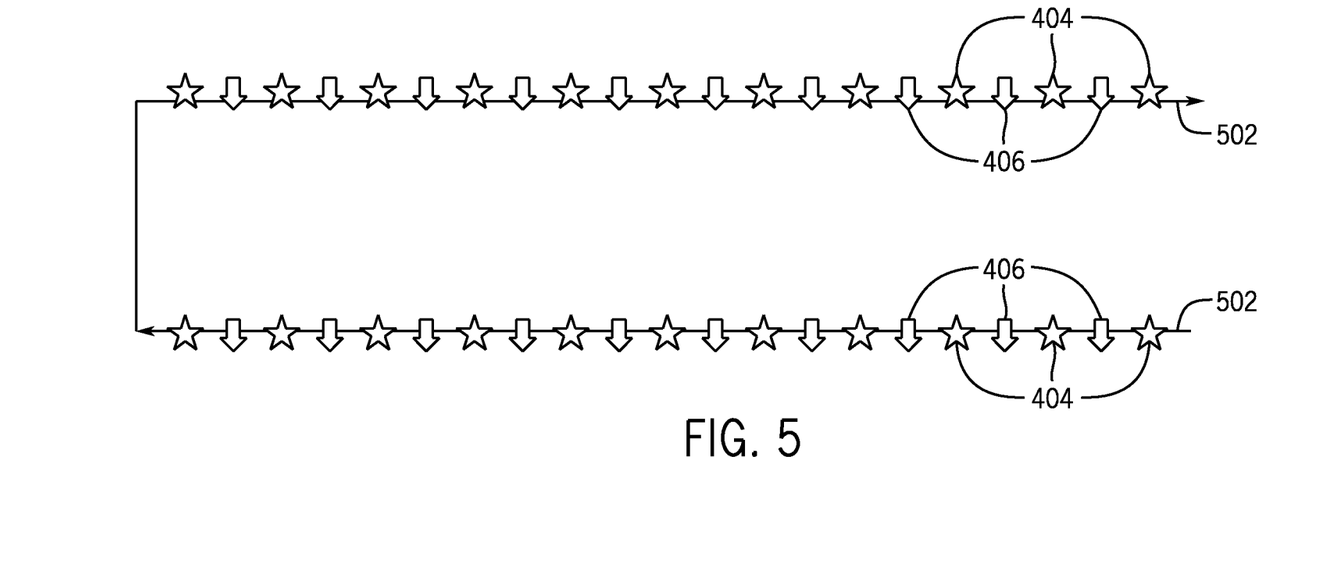

FIG. 5 shows another example shot pattern, in which the seismic vibrator array 104 traverses a generally U-shaped path represented as 502. In FIG. 5, a star (404) also represents a monopolar source activation, while an arrow (406) represents a source gradient activation.

Figure 6:
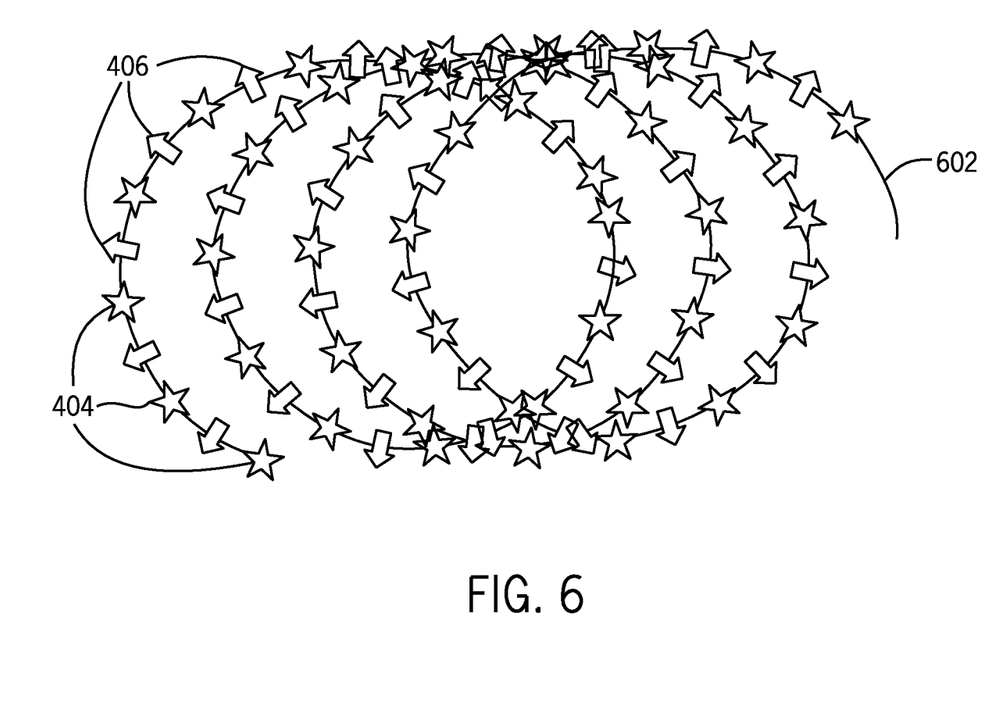

FIG. 6 is an example of another example shot pattern, in which the seismic vibrator array 104 is towed in a coil (spiral) shooting pattern, along path 602. The shot pattern includes alternating monopolar source activations and source gradient activations, as represented by the respective stars (404) and arrows (406).

In accordance with further implementations, the phase of the seismic vibrator array 104 can be controlled from shot to shot such that a residual shot noise (RSN) from one shot can be mitigated in the next shot. For a given shot, residual shot noise can result from a previous shot or from previous shots. If a shot pattern of the seismic vibrator array 104 is an alternating pattern that alternates between monopolar source activations and source gradient activations in successive shots, then residual shot noise from the monopolar shot activation can have a relatively strong effect on a subsequent source gradient activation.

By controlling the phase of the successive shots to reduce residual shot noise, the shot interval (the distance or time) between the successive shots can be reduced to increase in-line sampling using the monopolar source activations and source gradient activations, without compromising survey data quality. In-line sampling refers to acquiring survey data in response to respective shots of the seismic vibrator array 104. Increasing in-line sampling refers to acquiring a greater amount of survey data, since a larger number of shots are provided.

Increasing in-line sampling can improve results of acquiring survey data. For example, increasing in-line sampling can improve results of performing cross-line wavefield reconstruction using survey data acquired in response to source gradient wavefields. Cross-line wavefield reconstruction is discussed further below.

An example of a residual shot noise removal or reduction technique is described in U.S. Provisional Application No. 61/886,409, entitled "Using Phase-Shifted Marine Vibrator Sweeps to Reduce the Residual Shot Noise from Previous Shots," filed Oct. 3, 2013, which is hereby incorporated by reference for all purposes. In some implementations, the residual shot noise removal or reduction technique of U.S. Provisional Application No. 61/886,409 can be modified to separate the residual monopolar source noise (noise due to a previous monopolar source activation) from a source gradient record (containing survey data obtained in response to a source gradient wavefield), and to separate the residual source gradient noise (noise due to a previous source gradient activation) from a monopolar source record (containing survey data obtained in response to a monopolar source wavefield).

In some examples, residual noise removal or reduction can be accomplished by varying the phase of the monopolar source activation by 180° from monopolar source to monopolar source, while keeping the phase of the gradient source constant. For example, in FIG. 4, the phase of the monopolar source (represented by star 404-1) can be set at +90°, while the phase of the next successive monopolar source (represented by star 404-2) can be set at −90°. Thus, the phases of successive monopolar sources are varied. The monopolar source (404-1) and monopolar source (404-2)

thus have a phase difference of 180° from one another. The phases used for the source gradient sources (represented by arrows 406) do not have to be modified. Other combinations of phases can be used to achieve residual shot noise reduction.

In further implementations, control of the seismic vibrators of the seismic vibrator array 104 can also be split based on frequency, for example, such that the separation between the seismic vibrators is optimized to produce a gradient for different bandwidths. In some cases, the seismic source array 104 is controlled to produce just higher-frequency source gradients. In other words, the seismic vibrators of the seismic source array 104 that are configured to generate higher frequency wavefields are controlled to produce source gradient wavefields for at least certain shots. At lower frequencies, however, the respective seismic vibrators of the seismic vibrator array 104 are controlled to be swept in-phase, and thus would produce just monopolar source wavefields, and not source gradient wavefields.

For example, in the arrangement of FIG. 2, the seismic vibrators 106-1 and 106-2 (that produce wavefields at higher frequencies) can be controlled to alternate between in-phase and anti-phase, such that monopolar source wavefields and source gradient wavefields are alternately produced from shot to shot. However, the seismic vibrators 106-3 (that produce wavefields at a lower frequency) are controlled to be in-phase (so that the seismic vibrators 106-3 do not produce source gradient wavefields).

As noted above, survey data acquired in response to source gradient wavefields (such survey data is referred to as "source gradient data") can be used to perform cross-line reconstruction of sources. Reconstruction of a source refers to estimating a source based on actual sources.

Figure 7:
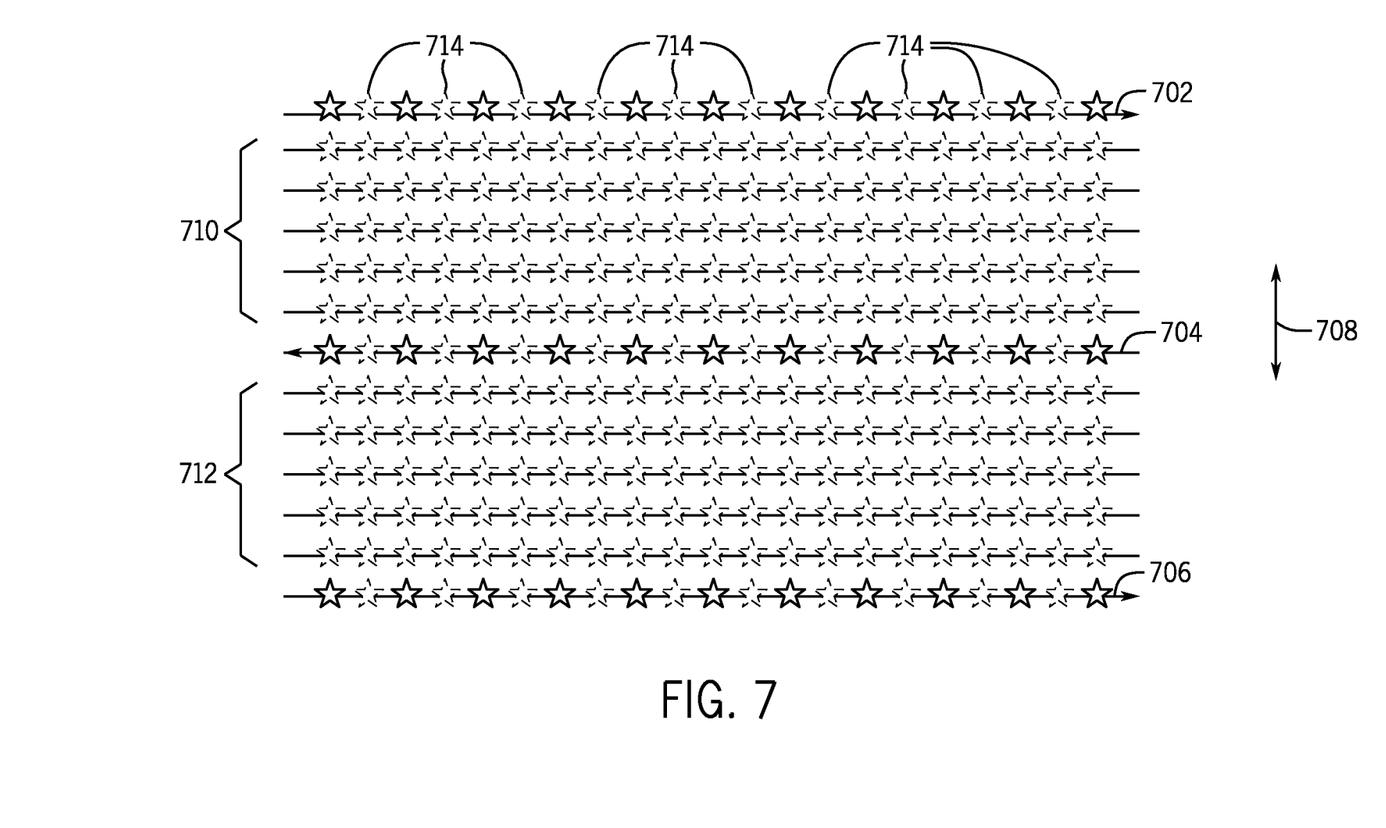
FIG. 7 is a schematic diagram of an example of reconstructing sources according to some implementations.

FIG. 7 illustrates a shot pattern produced by the seismic vibrator array 104 traversing along paths 702, 704, and 706. In FIG. 7, the darker arrows represent actual monopolar sources, while the lighter (dashed or dotted) arrows represent reconstructed monopolar sources. A direction of the arrow 702, 704, or 706 is the in-line direction (or direction of travel of the seismic vibrator array 104). The cross-line direction is the direction represented by dual arrow 708, which is generally perpendicular to the in-line direction. Cross-line reconstruction refers to reconstruction of sources between actual sources in the cross-line direction 708. Cross-line reconstruction can be accomplished by performing interpolation between the actual sources.

In FIG. 7, the reconstructed sources provided by the cross-line reconstruction include reconstructed sources 710 and 712. The reconstructed sources 710 are between paths 702 and 704, while the reconstructed sources 712 are between paths 704 and 706.

In the use of source gradient data (survey data acquired in response to a source gradient wavefield) for cross-line reconstruction, the use of a dedicated low-frequency seismic vibrator(s) can obviate having to employ a low-frequency source gradient wavefield, as cross-line reconstruction may not have to be performed at low frequencies. This has the added benefit of increasing low-frequency output, since the source gradient wavefield may result in reduced output energy. Varying the frequency outputs of different seismic vibrators can also allow the seismic vibrators to repeat sweeps at different time intervals, to allow in-line sampling to be varied for different frequencies. In some cases, this may allow for a monopolar source wavefield and source gradient wavefield to be acquired without aliasing.

In accordance with some implementations, cross-line reconstruction can include beyond Nyquist source side reconstruction. An example of beyond Nyquist source side reconstruction is described in Massimiliano Vassallo et al., "*Crossline Wavefield Reconstruction for Multi-Components Streamer Data: Part 1—Multi-Channel Interpolation by Matching Pursuit (MIMAP) Using Pressure and Its Crossline Gradient*," SOCIETY OF EXPLORATION GEOPHYSICISTS (2010), which is incorporated by reference. Whereas the method of Vassallo et al. performs reconstruction of the receiver side wavefield, it is noted that methods that use measurements of pressure and its crossline gradient can be adapted for application on the source-side (e.g. for source wavefield reconstruction), as the source wavefield and corresponding gradient wavefield have similar properties to the pressure wavefield and its gradient.

In addition to performing cross-line reconstruction, FIG. 7 also depicts in-line reconstruction to reconstruct monopolar sources between actual monopolar sources in an in-line direction. For example, along path 702, monopolar sources represented by lighter arrows 714 are reconstructed monopolar sources provided by in-line reconstruction.

In accordance with additional implementations, source gradient data can also be used for other purposes. For example, source gradient data can be used for up-down source side wavefield separation, for purposes of deghosting (to remove or attenuate ghost data). An example of up-down source side wavefield separation is described in U.S. Pat. No. 7,876,642, which is hereby incorporated by reference.

An issue associated with marine seismic surveying is the presence of ghost data. Ghost data refers to data in measurement data resulting from reflections from an air-water interface (e.g. 103 in FIG. 1) of the marine environment. A seismic wavefield generated by a seismic source is propagated generally downwardly into the subsurface structure. A reflected seismic wavefield (that is in response to the seismic wavefield propagated by the seismic source) propagates generally upwardly toward an arrangement of seismic receivers. In the marine environment, where receivers are generally positioned beneath the water surface, the seismic wavefield reflected from the subsurface structure continues to propagate upward past the receivers towards the air-water interface, where the seismic wavefield is reflected back downwardly.

This reflected, downwardly traveling seismic wavefield from the air-water interface causes interference with the wavefield that travels directly downwards from the source, resulting in undesirable ghost notches in the source wavefield. The presence of ghost notches can result in reduced accuracy when generating a representation of the subsurface structure based on the measurement data. Performing up-down source side wavefield separation allows for the upgoing source wavefield to be determined, such that its effects can be removed or attenuated to perform source side deghosting.

In some implementations, monopolar source data (survey data acquired responsive to a monopolar source wavefield) can be combined with source gradient data (survey data acquired responsive to a source gradient wavefield) to remove a source side ghost from survey data.

Source gradient data can also be used for multi-component imaging, which can also be referred to as vector acoustic imaging. An example of vector acoustic imaging is described in I. Vasconcelos et al., "*Reverse-Time Imaging of Dual-Source for Marine Seismic Data Using Primaries, Ghosts, and Multiples*," 74th EAGE CONFERENCE & EXHIBITION (June 2012), which is hereby incorporated by reference. Multi-component imaging provides an alternative to wavefield reconstruction, such as provided by the cross-line reconstruction discussed above. The monopolar source data and source gradient data are acquired, and fed into a multi-component imaging (that combines the monopolar source data and the source gradient data) that produces an image that contains interpolated data.

As noted above, in addition to a towed marine survey arrangement, a water bottom marine survey arrangement can be used instead. In a water bottom marine survey arrangement, survey receiver locations can be fixed. In a traditional water bottom marine survey, a marine vessel towing a seismic source would repeat source lines at close spacings. However, if source gradients are available using techniques or mechanisms according to some implementations, the source line spacing (spacing between arrows 702, 704, 706 in FIG. 7, for example), can be increased, such that survey time can be reduced (since fewer shots have to be performed). In the common-receiver domain, the combination of the alternating monopolar-gradient source array with a multi-component beyond Nyquist reconstruction technique can allow a smaller cross-line sampling to be recovered from the wider cross-line sampling depicted in FIG. 7.

To further increase survey efficiency, one alternating monopolar-gradient source array (104) may be used simultaneously with another alternating monopolar-gradient source array (104). For example, the sources may use a simultaneous source technique based on time or phase dithering, phase sequencing, or a frequency-sparse technique. An example of time dithering is described in Moore et al., "Simultaneous Source Separation Using Dithered Sources," SEG Las Vegas 2008 Annual Meeting, which is hereby incorporated by reference. An example of phase sequencing is described in U.S. Patent Publication No. US 2014/0278119, which claims priority to Provisional Application No. 61/788,265, entitled "Simultaneous Seismic Sources," filed Mar. 15, 2014, which are both hereby incorporated by reference. An example of a frequency-sparse technique is described in U.S. Publication No. 2014/0278116, which claims priority to Provisional Application No. 61/787,643, entitled "Frequency-Sparse Sources," filed Mar. 15, 2013, which are both hereby incorporated by reference.

Figure 8:
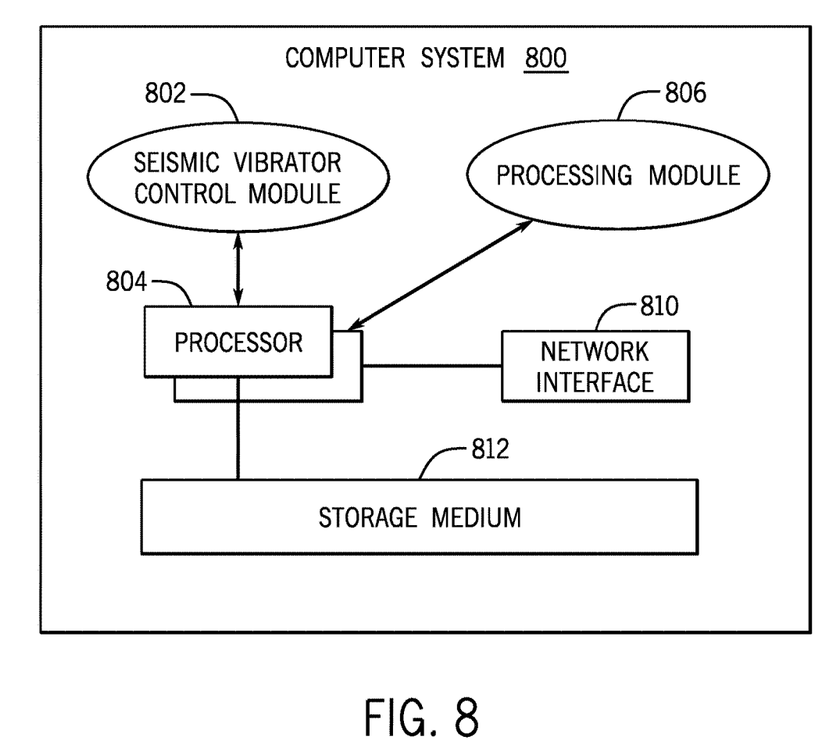
FIG. 8 is a block diagram of a computer system according to some examples.

FIG. 8 is a block diagram of a computer system 800, which can be part of the controller 108 shown in FIG. 1. The computer system 800 includes a seismic vibrator control module 802, which is executable on one or multiple processors 804 to control seismic vibrators of the seismic vibrator array 104. The computer system 800 can also include a processing module 806, which is executable on the processor(s) 804 to perform any of the tasks discussed above, such as cross-line reconstruction, in-line reconstruction, up-down source side wavefield reconstruction, and/or multi-component imaging, in some examples. Note that the processing module 806 can be provided in a computer system that is separate from a computer system including the seismic vibrator control module 802.

The processor(s) 804 can be coupled to a network interface 808 (to allow the computer system 800 to communicate over a network) and a storage medium (or storage media) 810, to store data and machine-executable instructions.

The storage medium (or storage media) 810 can be implemented as one or more non-transitory computer-readable or machine-readable storage media. The storage media can include different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A marine seismic survey method comprising:
at one or more spatial locations, activating two or more seismic vibrators in a seismic vibrator array where the relative phase of each vibrator is chosen such that the seismic vibrator array physically emits a source gradient wavefield for surveying a target structure; and
at one or more other spatial location, activating two or more seismic vibrators in the seismic vibrator array where the relative phase of each vibrator is chosen such that the seismic vibrator array physically emits a monopole wavefield for surveying the target structure.

2. The method of claim 1, wherein the producing of the source gradient wavefield and the producing of the monopolar wavefield are part of a pattern of monopolar source wavefields and source gradient wavefields produced in response to activating of seismic vibrators in the seismic vibrator array.

3. The method of claim 1, wherein activating the two or more seismic vibrators in the seismic vibrator array comprises activating volumetric seismic vibrators in the seismic vibrator array, the activating of the volumetric seismic vibrators causing at least two of the seismic vibrators to be not in phase, to produce the source gradient wavefield.

4. The method of claim 3, wherein activating the volumetric seismic vibrators in the seismic vibrator array comprises providing activation signals to the seismic vibrators in the seismic vibrator array, wherein a first output signal produced by one of the at least two volumetric seismic vibrators is out of phase with respect to a second output signal produced by another of the at least two volumetric seismic vibrators.

5. The method of claim 4, wherein the first and second output signals are in anti-phase.

6. The method of claim 4, wherein the first and second output signals have a phase difference whose cosine is less than zero.

7. The method of claim 3, further comprising: at a different time, activating the at least two volumetric seismic vibrators in the seismic vibrator array to be in-phase to produce an approximately monopolar source wavefield.

8. The method of claim 3, wherein the at least two volumetric seismic vibrators are separated by a distance that is less than one-half of a shortest wavelength of interest in a direction of the source gradient wavefield.

9. The method of claim 3, wherein the volumetric seismic vibrators in the seismic vibrator array are provided at a plurality of depths in a body of water, wherein volumetric seismic vibrators at a first of the plurality of depths emit at a first frequency, and volumetric seismic vibrators at a second of the plurality of depths emit at a second, different frequency.

10. The method of claim 9, wherein a separation distance of the volumetric seismic vibrators is matched to a frequency range emitted at each depth level.

11. The method of claim 9, wherein the volumetric seismic vibrators at the first depth are controlled to provide the source gradient wavefield and a monopolar source wavefield for different shots, and wherein the volumetric seismic vibrators at the second depth are controlled to provide just monopolar source wavefields for different shots.

12. The method of claim 3, further comprising:
using monopolar source data acquired responsive to a monopolar source wavefield and source gradient data acquired responsive to the source gradient wavefield to perform deghosting.

13. The method of claim 3, further comprising:
using monopolar source data acquired responsive to a monopolar source wavefield and source gradient data acquired responsive to the source gradient wavefield to perform multi-component imaging.

14. The method of claim 3, further comprising:
using monopolar source data acquired responsive to a monopolar source wavefield and source gradient data acquired responsive to the source gradient wavefield to perform beyond Nyquist source reconstruction.

15. A computer system comprising:
at least one processor configured to:
at one or more spatial locations, control activation of two or more marine seismic vibrators in a marine seismic vibrator array, where the relative phase of each vibrator is chosen such that the activating causes the seismic vibrator array to physically emit a source gradient wavefield for surveying a target structure; and
at one or more other spatial locations, control activation of the two or more seismic vibrators in the seismic vibrator array where the relative phase of each vibrator is chosen such that the seismic vibrator array physically emits a monopole wavefield for survey the target structure.

16. The computer system of claim 15, wherein the at least two marine seismic vibrators are separated by a distance that is between one-third and one-half of a shortest wavelength of interest in a direction of the source gradient wavefield.

17. The computer system of claim 15, wherein the at least one processor is configured to further:
control phases of at least a subset of the marine seismic vibrators in the marine seismic vibrator array in different shots to provide residual noise reduction between successive shots.

18. The computer system of claim 15, wherein the at least one processor is configured to further:
use monopolar source data acquired responsive to a monopolar source wavefield and source gradient data acquired responsive to the source gradient wavefield to perform one or more of deghosting, multi-component imaging, and cross-line source reconstruction.

19. An article comprising at least one non-transitory computer-readable storage medium storing instructions that upon execution cause a system to:
at one or more spatial locations, control activation of two or more marine seismic vibrators in a marine seismic vibrator array, where the relative phase of each vibrator is chosen such that the activating causes the seismic vibrator array to physically emit a source gradient wavefield for surveying a target structure; and
at one or more other spatial locations, control activation of the two or more seismic vibrators in the seismic vibrator array where the relative phase of each vibrator is chosen such that the seismic vibrator array physically emits a monopole wavefield for survey the target structure.

* * * * *